United States Patent
Wu

(10) Patent No.: US 6,350,517 B1
(45) Date of Patent: Feb. 26, 2002

(54) EASY-TO-TEAR SAFETY ADHESIVE TAPE

(76) Inventor: Chien-Hung Wu, No. 3, Lane 62, Dader 3 Street, Taoyuan Hsien (TW)

( * ) Notice: Subject to any disclaimer, the term of this patent is extended or adjusted under 35 U.S.C. 154(b) by 0 days.

(21) Appl. No.: 09/514,343

(22) Filed: Feb. 28, 2000

(51) Int. Cl.⁷ .............................. C09J 7/02; B32B 7/12
(52) U.S. Cl. ............... 428/354; 428/352; 428/355 AC; 428/480; 428/483
(58) Field of Search .................. 428/354, 343, 428/352, 480, 483, 355 AC, 355 CP, 910

(56) References Cited

U.S. PATENT DOCUMENTS 4,525,416 A * 6/1985 Hammerschmidt et al. . 428/220
5,672,402 A * 9/1997 Kreckel et al. ............ 428/34.2

* cited by examiner

Primary Examiner—Daniel Zirker
(74) Attorney, Agent, or Firm—Bacon & Thomas, PLLC

(57) ABSTRACT

A safety adhesive tape having a base layer, a hard resin layer, an adhesive layer, and an anti-sticking layer, the base layer being a plastic film, the hard resin layer being coated on the top side of the base layer, the adhesive layer being coated on the bottom side of the base layer for sticking, the anti-sticking layer being a stripping film covered on one side of the hard resin layer opposite to the base layer. The hard resin layer changes the structural property of the adhesive tape, enabling the adhesive tape to be easily pulled apart with the hands, or cut with a cutter.

7 Claims, 1 Drawing Sheet

EASY-TO-TEAR SAFETY ADHESIVE TAPE

BACKGROUND OF THE INVENTION

The present invention relates to an adhesive tape, and more particularly to a safety adhesive tape, which can easily be pulled apart with the hands or cut with a cutter.

Adhesive tapes are intensively used in packing thinks. A regular adhesive tape is generally comprised of a base layer, an adhesive layer, and an anti-sticking layer. The base layer for a conventional adhesive tape has sufficient tensile strength and elongation. Because the base layer of a conventional adhesive tape is resilient, it is difficult to pull apart a conventional adhesive tape with the hands. Further, the present inventor invented an adhesive tape on which the user can print a printing, draw a pattern, or write words.

SUMMARY OF THE INVENTION

The present invention has been accomplished under the circumstances in view. It is one object of the present invention to provide an adhesive tape, which can easily pulled apart with the hands, or cut with a cutter. It is another object of the present invention to provide an adhesive tape, which allows the user to write on it. According to one embodiment of the present invention, the easy-to-tear safety adhesive tape comprises a base layer, a hard resin layer, an adhesive layer, and an anti-sticking layer. The base layer is a long, narrow, flat piece of plastic material, having a top side and a bottom side. The base layer is formed of polyester film, bi-axially extended polypropylene film, or polyvinyl chloride film, having a thickness within about 0.008 mm to 0.08 mm, or preferably within about 0.01 mm to 0.05 mm. The hard resin layer is selected from acrylic resin, ethylene polybenzene resin, or polyamino-methylurethane resin group, and coated on the top side of the base layer, having a thickness within about 0.002 mm to 0.04 mm, or preferably within about 0.004 mm to 0.02 mm. The adhesive layer is selected from hydrophilic acrylic glue, oil acrylic glue, or thermo-bonding glue, and coated on the bottom side of the base layer, having a thickness within about 0.001 to 0.03 mm, or preferably within about 0.05 mm to 0.01 mm. The anti-sticking layer is selected from silicone resin or a wax of low molecular weight, and coated on one side of the hard resin layer opposite to the base layer. The amount of coating of the anti-sticking layer is within about 0.0002 $gm/m^2$ to 20.0 $gm/m^2$, or preferably within about 0.002 $gm/m^2$ to 2.00 $gm/m^2$. In order for writing upon, a writing layer is sandwiched in between the hard resin layer and the anti-sticking layer. The writing layer is formed of a resin mixture. The resin mixture is composed of a resin and an additive. The resin for the resin mixture is composed of at least one of acrylic resin, polyamino-methylurethane resin group, and epoxy resin. The additive is composed of at least one of calcium carbonate, silica, and titanium white powder. The resin mixture is prepared at the ratio by weight within about 1000:1 to 10:1, or preferably within about 100:1 to 20:1. This thickness of the writing layer is within about 0.0001 mm to 0.05 mm, or preferably within about 0.001 mm to 0.01 mm. The safety adhesive tape can be rolled up in a roll on a reel or the like without the use of a stripping paper. When rolled up, the adhesive layer is pressed on the anti-sticking layer. The anti-sticking property of the anti-sticking layer enables the anti-sticking layer to be used as a stripping paper. The anti-sticking layer protects the adhesive layer, and can easily be separated from the adhesive layer. When in use, the user can directly pull apart the adhesive tape with the hands subject to the desired length. Because no stripping paper is used, no litter is produced. Because the adhesive tape has a hard resin layer (which reduces the elongation and breaking strength of the adhesive tape), the adhesive tape can easily be pulled apart with the hands.

DETAILED DESCRIPTION OF THE PREFERRED EMBODIMENT

Figure 1:
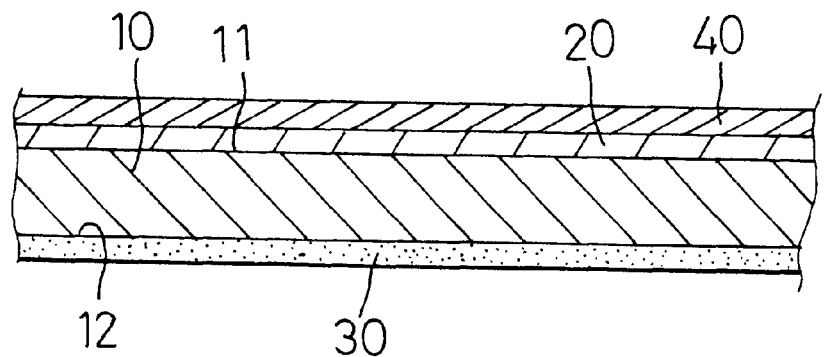
FIG. 1 is a sectional view of a transparent safety adhesive tape according to the present invention.

Referring to FIG. 1, a transparent safety adhesive tape is shown comprised of a base layer 10, a hard resin layer 20, an adhesive layer 30, and an anti-sticking layer 40. The base layer 10 has a top side 11 and a bottom side 12. The hard resin layer 20 is coated on the top side 11 of the base layer 10. The adhesive layer 30 is coated on the bottom side 12 of the base layer 10. The anti-sticking layer 40 is covered on one side of the hard resin layer 20 opposite to the base layer 10.

Figure 2:
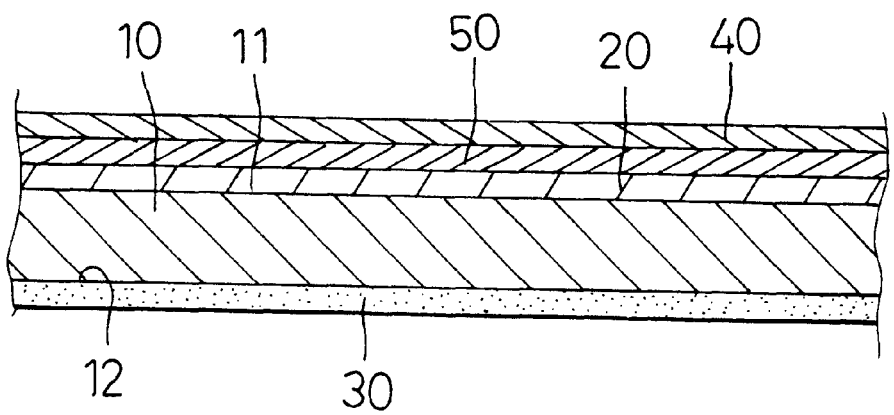
FIG. 2 is a sectional view of a writing safety adhesive tape according to the present invention.

Referring to FIG. 2, a writing safety adhesive tape is shown comprised of a base layer 10, a hard resin layer 20, an adhesive layer 30, an anti-sticking layer 40, and a printing layer 50. The base layer 10 is sandwiched in between the adhesive layer 30 and the hard resin layer 20. The printing layer 50 is sandwiched in between the hard resin layer 20 and the anti-sticking layer 40.

EXAMPLE 1
(Transparent Safety Adhesive Tape):

For fabricating a transparent safety adhesive tape shown in FIG. 1, a polyester film of thickness about 0.023 mm is used as a base layer, and then an acrylic resin is coated on the top side of the base layer to form a hard resin layer of thickness about 0.01 mm, and then a wax of low molecular weight of amount about 0.1 $gm/m^2$ is coated on the surface of the hard resin layer to form an anti-sticking layer, and then a hydrophilic acrylic glue is coated on the bottom side of the base layer to form an adhesive layer of thickness about 0.01 mm.

EXAMPLE 2
(Writing Safety Adhesive Tape)

For fabricating a transparent safety adhesive tape shown in FIG. 2, the aforesaid fabrication procedure is repeated, however a mixture of acrylic resin and calcium carbonate is coated on the hard resin layer before the coating of the wax, enabling a writing layer to be sandwiched in between the hard resin layer and the anti-sticking layer. The thickness of the writing layer is about 0.01 mm. The mixture of acrylic resin and calcium carbonate is prepared by mixing 100 parts by weight of acrylic resin with 1 part of calcium carbonate.

COMPARATIVE EXAMPLE 1
(Transparent safety adhesive tape fabrication method according to the prior art).

Repeat the procedure of Example 1, however eliminate the hard resin layer, i.e., use a polyester film of thickness about 0.025 as a base layer, and then coat a wax of low molecular weight of amount about 0.1 $gm/m^2$ on the top side of the base layer to form an anti-sticking layer, and then coat a hydrophilic acrylic glue on the bottom side of the base layer to form an adhesive layer of thickness about 0.01 mm.

In comparison with an adhesive tape according to Comparative Example 1 and an adhesive tape according to Example 1, the adhesive tape according to the present invention has an additional hard resin layer. After test, the two adhesive tapes show different properties as indicated in the following Table I.

TABLE I

| Adhesive Tape | Elongation (%) | Breaking strength (kg/mm) |
| --- | --- | --- |
| Comparative Example 1 | 110 | 12 |
| Example 1 | 40 | 5 |

As indicated in Table I, the adhesive tape of Example 1 according to the present invention shows lower elongated and breaking strength readings in comparison with the adhesive tape of Comparative Example 1 according to the prior art. This means that an adhesive tape having a hard resin layer can easily be torn or cut. Therefore, an adhesive tape according to the present invention can easily be pulled part with the hands, or cut with a cutter.

It is to be understood that the aforesaid examples are designed for illustration only and are not intended for use as a definition of the limits and scope of the invention disclosed. For example, the base layer can be formed of polyester film, bi-axially extended polypropylene film, or polyvinyl chloride film; the hard resin layer can be formed of acrylic resin, ethylene polybenzene resin, or polyamino-methylurethane resin group; the adhesive layer can be formed of hydrophilic acrylic glue, oil acrylic glue, or thermo-bonding glue; the anti-sticking layer can be formed of silicone or a wax of low molecular weight; the writing layer can be formed of a resin mixture comprising a resin and an additive prepared at the ratio by weight of within about 1000:1 to 10:1, wherein the resin can be acrylic resin, polyamino-methylurethane resin, or epoxy resin, and the additive can be calcium carbonate, silica, or titanium white powder.

What the invention claimed is:

1. An easy-to-tear safety adhesive tape comprising:
   a base layer formed of one of polyester film, bi-axially extended polypropylene film and polyvinyl chloride film of thickness within about 0.008 mm to 0.08 mm, said base layer having a top side and a bottom side;
   a hard resin layer of thickness within about 0.002 mm to 0.04 mm formed of one of acrylic resin, ethylene polybenzene resin and polyamino-methylurethane resin group and coated on the top side of said base layer;
   an adhesive layer of thickness within about 0.001 to 0.03 mm formed of one of hydrophilic acrylic glue, oil acrylic glue and thermo-bonding glue and coated on the bottom side of said base layer; and
   an anti-sticking layer of amount within about 0.0002 gm/m$^2$ to 20.0 gm/m$^2$ formed of one of silicon resin and a wax of low molecular weight and coated on one side of said hard resin layer opposite to said base layer.

2. The easy-to-tear safety adhesive tape of claim 1 wherein said base layer is formed of polyester film of thickness within about 0.01 mm to 0.05 mm.

3. The easy-to-tear safety adhesive tape of claim 1 wherein said hard resin layer is formed of acrylic resin of thickness within about 0.004 mm to 0.02 mm.

4. The easy-to-tear safety adhesive tape of claim 1 wherein said adhesive layer is formed of hydrophilic acrylic glue of thickness within about 0.005 mm to 0.01 mm.

5. The easy-to-tear safety adhesive tape of claim 1 wherein said anti-sticking layer is formed of a wax of low molecular weight of amount within about 0.0002 gm/m$^2$ to 2.00 gm/m$^2$.

6. The easy-to-tear safety adhesive tape of claim 1 further comprising a writing layer of thickness within about 0.0001 mm to 0.05 mm formed of a resin mixture and sandwiched in between said hard resin layer and said anti-sticking layer, said resin mixture comprising a resin and an additive prepared at the ratio by weight of within about 1000:1 to 10:1, said resin being obtained from at least one of acrylic resin, polyamino-methylurethane resin group, and epoxy resin, said additive being obtained from at least one of calcium carbonate, silica, and titanium white powder.

7. The easy-to-tear safety adhesive tape of claim 6 wherein said writing layer has a thickness within about 0.001 mm to 0.01 mm, and is formed of a resin mixture comprising acrylic resin and calcium carbonate prepared at the ratio by weight of within about 100:1 to 20:1.

* * * * *